June 26, 1962
G. A. LYON, JR
3,040,735
BAKING PAN STRUCTURE
Filed Jan. 20, 1959
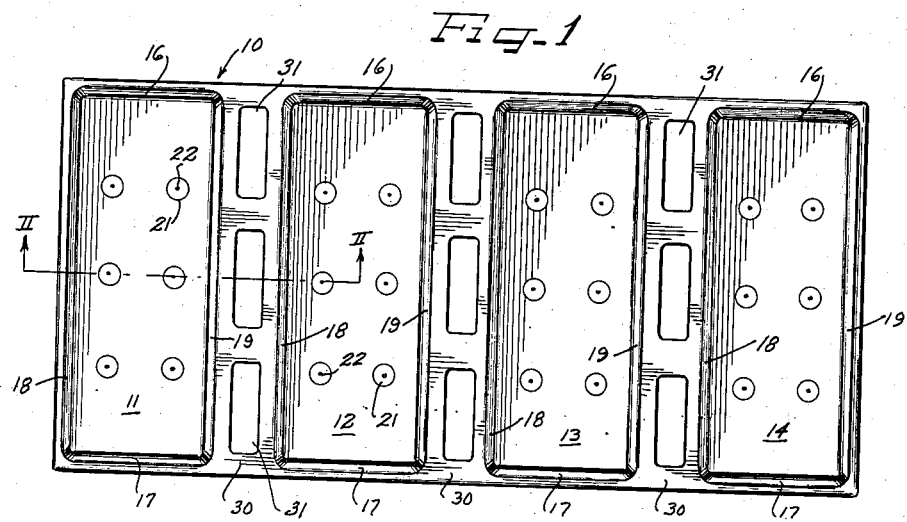
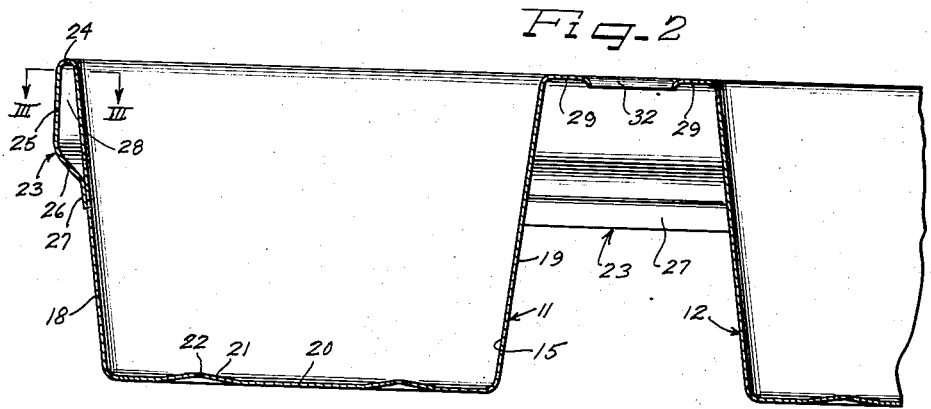
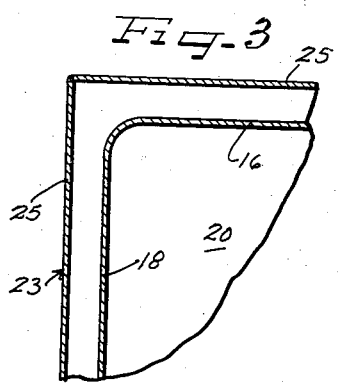
Inventor
George A. Lyon, Jr.

United States Patent Office 3,040,735
Patented June 26, 1962

3,040,735
BAKING PAN STRUCTURE
George A. Lyon, Jr., Birmingham, Mich.
(13881 W. Chicago Blvd., Detroit 28, Mich.)
Filed Jan. 20, 1959, Ser. No. 788,016
2 Claims. (Cl. 126—376)

The present invention relates broadly to the art of baking, and is more particularly concerned with a unitary pan structure of proven utility in the baking of bread doughs and related materials.

Baking pans having a plurality of spaced dependent pan portions defining dough receiving cavities have heretofore been formed by provision on each pan portion of an outwardly extending flange around the periphery thereof, locating a reinforcing wire beneath the flange portion and against the outer walls of each pan portion so that opposite ends of the wire extended in spaced relation outwardly from one side wall of the pan portion, rolling the peripheral flange around the reinforcing wire, welding the ends of the reinforcing wire for one pan portion to the ends of the reinforcing wire of an adjacently located pan portion, and then welding a reinforcing band around the spaced pan portions as thus formed. As is apparent, the described manner of fabricating baking pans is a time consuming one, and suffers among other disadvantages from a high production cost.

It is accordingly an important aim of the present invention to provide a bread pan structure formed in a manner to eliminate the necessity for the reinforcing wire and reinforcing band associated with prior art structures.

Another object of this invention lies in the provision of a unitary bread pan structure comprising a plurality of spaced pan portions reinforced along opposite ends and along one side wall by a downwardly turned flange portion integral with the pan portion.

A further object of the present invention is to provide a baking pan structure comprising a sheet metal member shaped to define a plurality of spaced cavities to receive dough therein, each cavity being surrounded on at least two sides by a downwardly turned flange portion and connected to an adjacent cavity by an essentially flat flange portion to provide a unitary structure wherein the downwardly turned flange portion reinforces the structure and additionally frames the same.

Other objects and advantages of the present invention will become more apparent during the course of the following description, particularly when taken in connection with the accompanying drawings.

In the drawings, wherein like numerals are employed to designate like parts throughout the same:

FIGURE 1 is a top plan view of a baking pan structure embodying the concepts of this invention;

FIGURE 2 is a vertical sectional view taken substantially along the line II—II of FIGURE 1; and FIGURE 3 is a fragmentary sectional view taken generally along the line III—III of FIGURE 2.

Referring now to FIGURES 1 and 2, there is shown a unitary or integral pan structure designated generally by the numeral 10 and comprising a plurality of spaced and connected pan portions, four of which are provided in the exemplary embodiment shown and designated therein by the numerals 11, 12, 13 and 14. Each pan portion defines interiorly a dough receiving cavity 15, provided by a pair of inwardly sloping spaced end walls 16 and 17, spaced and inwardly sloping side walls 18 and 19, and a generally flat bottom wall 20, which may be inwardly dimpled as at 21 and apertured at 22 to improve the heat transfer to the dough in the cavity 15 during the baking operation. As indicated in FIGURE 1, the dimples 21 may be arranged in longitudinally and transversely extending rows.

The baking pan structure 10 may be formed of any suitable sheet metal, and a relatively light gauge stainless steel is presently preferred. While the embodiment of the invention shown in the drawings is in the form of a baking pan for bread doughs, it is of course appreciated that by minor modifications in the shape of the article the baking pan may be utilized for cake doughs and in the baking of other food materials. In addition, the walls defining the dough receiving cavity 15 may carry thereon an oxidized chromium plate coating to prevent sticking of the baked goods.

In accordance with the principles of this invention, there is eliminated the earlier mentioned reinforcing wire and band to rigidify the pan portions and to attach said pan portions one to the other. This is accomplished by a self-rimming flange structure integral with the pan portions and functioning in a dual manner to reinforce the pan portions and frame the same. As appears in the drawings, the baking pan structure 10 is framed about its periphery by flange means generally designated by the numeral 23 integral with opposite end walls 16 and 17 of each pan portion 11—14 and integral with side wall 18 of pan portion 11 and side wall 19 of pan portion 14. It is thus to be seen that all pan portions are framed at opposite ends by the flange means 23, while pan portions 11 and 14 at opposite ends of the structure 10 are framed also along one side wall.

The flange means 23 is formed in a manner to provide a smoothly curved rim portion 24 connecting with the noted walls of the pan portions, a generally flat leg portion 25 spaced from the pan portion walls, a generally flat and inwardly turned leg portion 26, and a generally flat downwardly extending leg portion 27 bearing against the noted end walls of the pan portions and secured thereto by spot-welding or related techniques. It will be observed that the flange means accordingly extends outwardly, downwardly, inwardly and downwardly and provides about the pan structure 10 a peripheral space or opening 28. It will further be observed that the rim portion 24 of the flange means 23 frames the entire structure, and that the leg portions 25, 26 and 27 of the flange means 23 reinforce or rigidify the pan portions a substantial distance downwardly along the walls thereof.

The intermediate pan portions 12 and 13 are further provided outwardly of their opposite side walls 18 and 19, and the pan portions 11 and 14 at opposite ends of the pan structure 10 are formed along a single or unframed side wall 19 and 18, respectively, with a generally flat flange portion 29. As will be noted hereinafter in connection with a preferred method of forming the pan structure 10, the relatively flat outwardly extending flange means on the pan portions are seam welded one to the other to provide a connecting flange 30 which embodies the pan portions 11—14 into the unitary or integral structure of FIGURE 1. As appears in FIGURE 2, the downwardly turned flange means 23 framing the structure 10 and reinforcing the same surrounds opposite ends of the flange means 30. While all applications may not render this a requirement, the flange means 30 may be provided with a plurality of spaced openings 31 to permit heat transfer through the structure 10 during the baking operation. In the event such openings 31 are employed, the flange portions surrounding said openings are preferably downwardly and inwardly turned as at 32 in FIGURE 2 for reinforcement purposes.

It is to be seen from the foregoing that applicant has provided a novel baking pan structure wherein the pan portions are provided with flange means which functions in a dual manner to reinforce the pan portions and to frame the same. There is thus avoided the prior art requirement of reinforcing wire means around each pan portion, and the use of a band to join the pan portions one to the other. The pan structure 10 of this invention is readily formed by mass production techniques utilizing relatively low cost die structures, and the article of FIGURE 1 having the flange means shown is characterized by a strength and durability markedly greater than the known pan structures.

Various changes and modifications may of course be made in the structure disclosed, as well as in the practice of the described method, without departing from the novel concepts of the present invention.

I claim as my invention:

1. A pan structure for simultaneously baking therein a plurality of bread loaves and the like, comprising a plurality of spaced depending pan portions each having spaced side and end walls defining therebetween a dough receiving cavity, a shaped tubular flange portion integral with one side wall and the end walls of pan portions at opposite ends of the structure and with the end walls of intermediate pan portions, and a generally flat flange portion extending outwardly from the other side wall of each pan portion at opposite ends of the structure and from both side walls of intermediate pan portions and secured one to the other to provide a unitary structure, said shaped flange portion extending from said walls outwardly, downwardly and inwardly and secured to said walls of each of the pan portions intermediate the top and bottom of the pan portions with the shaped flange portion being extended continuously around the periphery of the unitary structure and providing a rigid frame therefor which reinforces the unitary structure throughout.

2. A pan structure for simultaneously baking therein a plurality of bread loaves and the like, comprising a plurality of spaced depending pan portions each having spaced side and end walls defining therebetween a dough receiving cavity, a shaped tubular flange portion integral with one side wall and the end walls of pan portions at opposite ends of the structure and with the end walls of intermediate pan portions, and a generally flat flange portion extending outwardly from the other side wall of each pan portion at opposite ends of the structure and from both side walls of intermediate pan portions and secured one to the other to provide a unitary structure, the tubular flange portion being shaped to include a curved outwardly extending section integral with the pan portion, a generally flat downwardly extending section spaced from the pan portion, an essentially flat section extending inwardly thereto, and a generally flat and downwardly extending section contacting the pan portion and providing attaching means attached to said walls of each of said pan portions intermediate the top and bottom of the pan portions with the shaped flange portion extended continuously around the periphery of the pans comprising the unitary structure providing a rigid frame therefor which reinforces the same throughout.

References Cited in the file of this patent

UNITED STATES PATENTS

| | | |
|---|---|---|
| 1,084,790 | Cohn | Jan. 20, 1914 |
| 1,627,650 | Katzinger | May 10, 1927 |
| 1,789,981 | Katzinger | Jan. 27, 1931 |
| 1,921,256 | Hiester | Aug. 8, 1933 |
| 1,965,648 | Jackson | July 10, 1934 |
| 2,164,582 | Gibson | July 4, 1939 |